United States Patent [19]

Santen et al.

[11] 4,340,420
[45] Jul. 20, 1982

[54] METHOD OF MANUFACTURING STAINLESS STEEL

[75] Inventors: Sven Santen, Hofors; John O. Edström, Stocksund, both of Sweden

[73] Assignee: SKF Steel Engineering Aktiebolag, Hofors, Sweden

[21] Appl. No.: 200,151

[22] Filed: Oct. 24, 1980

[30] Foreign Application Priority Data

Jun. 10, 1980 [SE] Sweden ............... 8004311

[51] Int. Cl.³ ............................................. C22B 4/00
[52] U.S. Cl. ........................................ 75/10 R; 75/11; 75/12
[58] Field of Search ...................... 75/10-12

[56] References Cited

U.S. PATENT DOCUMENTS

| | | | |
|---|---|---|---|
| 3,615,348 | 10/1971 | Tanczyn | 75/11 |
| 3,728,101 | 4/1973 | d'Entremont | 75/11 |
| 4,072,504 | 2/1978 | Perdahl | 75/21 |
| 4,235,623 | 11/1980 | Rath | 75/11 |

*Primary Examiner*—P. D. Rosenberg
*Attorney, Agent, or Firm*—Brumbaugh, Graves, Donohue & Raymond

[57] ABSTRACT

A method of manufacturing stainless steel comprising the steps of injecting a starting material containing chromium oxide and iron oxide into the lower portion of a reactor, said reactor containing a solid reducing agent, passing said starting material into a reduction zone within said lower portion, said reduction zone being maintained by the use of a plasma generator adjacent thereto, substantially instantaneously reducing and melting said starting material in said reduction zone, and removing the melted and reduced chromiferous product from the bottom of the reactor. The chromiferous product may then be further refined in an AOD convertor or the like.

11 Claims, 1 Drawing Figure

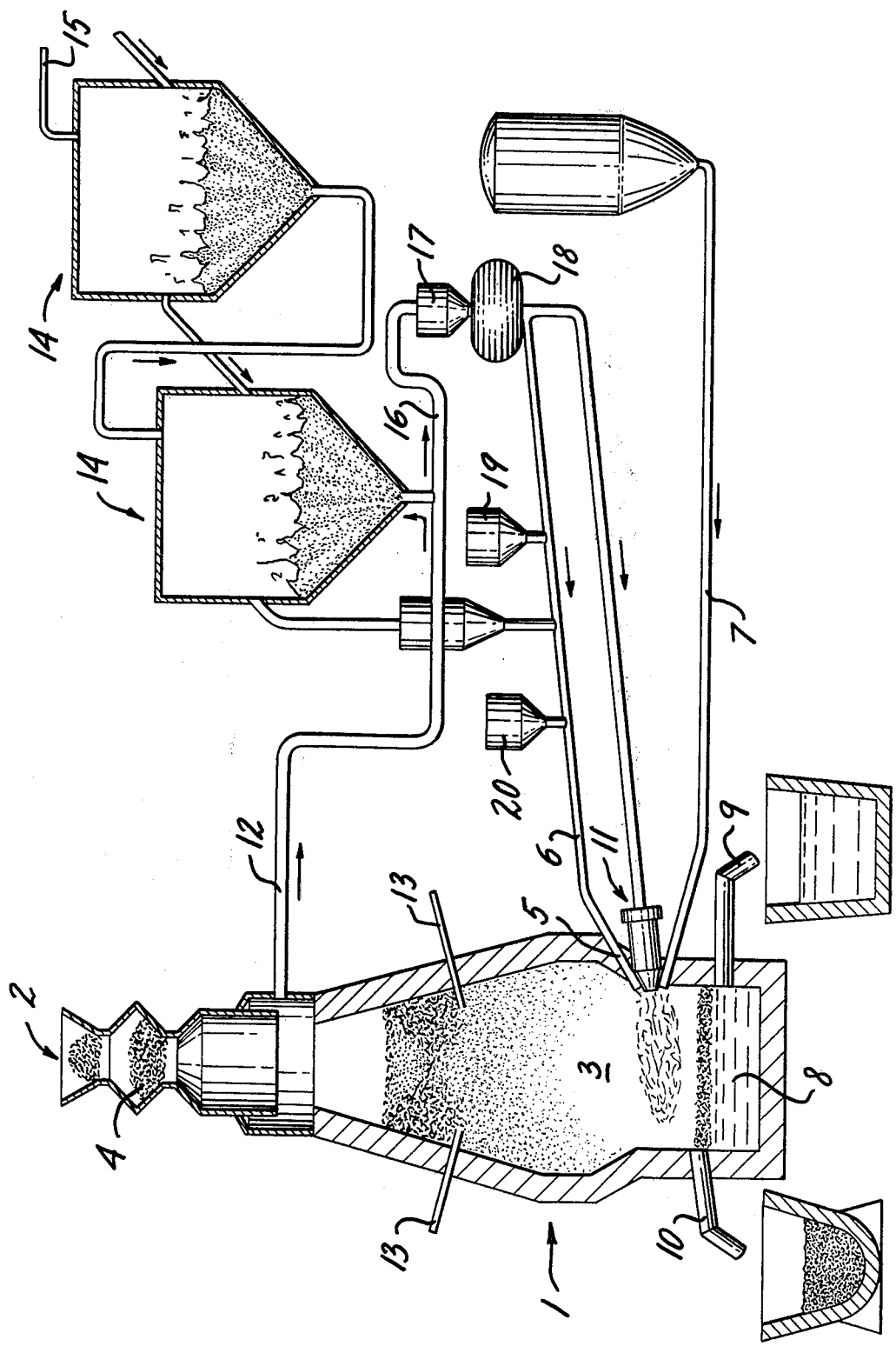

METHOD OF MANUFACTURING STAINLESS STEEL

BACKGROUND OF THE INVENTION

The present invention relates to a method of manufacturing stainless steels. More particularly, the invention is directed to the method of manufacturing chromium steels having a low carbon content from starting materials which include chromium oxide.

As is presently known in the art, chromite (chromium ore) is used in the manufacture of chromium steels and various multi-step processes are used for this purpose. For example, there is known a three-step process in which the ore is reduced in a ferro-chromium furnace to obtain a suitable chromium alloy which is then cast into large bars and fed into an arc furnace where it is mixed with scrap to give a basic melt. This is then tapped over into an argon-oxygen-degassing (AOD) converter where it is refined to stainless steel with a mixture of oxygen gas and inert gas (e.g. argon). Such conventional processes require expensive equipment, are laborious and also consume a considerable amount of energy.

The present invention also represents an improvement with respect to the method disclosed in U.S. Pat. No. 4,072,504 wherein there is generally disclosed a method of reducing metal oxides by pre-reducing the oxides with the reducing gases released during final reduction.

BRIEF SUMMARY OF THE INVENTION

It has now surprisingly been found that many of the drawbacks and difficulties of the known processes can be avoided. Thus there is provided according to the invention a method of manufacturing stainless steels characterized in that in a first step, the starting material is blown into the bottom of a reactor filled with solid reducing agent and caused to pass a reduction zone generated with the help of a plasma generator. The solid reducing agent may be char, char together with coal, form coke, or some other known agent or combination of agents. The oxides existing in the starting material are thus brought to substantially instantaneous final reduction and melting. The melt is thereafter tapped off and is subjected in a second step to a refining process. In this manner, the two-step method according to the invention eliminates the need for the ferro-chromium furnace and the arc furnace used previously.

BRIEF DESCRIPTION OF DRAWINGS

For a better understanding of the invention, reference may be made to the following description of an exemplary embodiment taken in conjunction with the single FIGURE of the accompanying drawing which illustrates diagrammatically a mode of carrying out the invention.

DETAILED DESCRIPTION OF EXEMPLARY EMBODIMENT

According to a preferred embodiment of the invention a fine-particled starting material, preferably chromite and iron ore, can be used. The starting material is suitably blown into the reactor by means of a carrier gas and the reaction gas generated in the reactor can, for instance, be partially used as carrier gas. According to the invention slag-formers and possibly fuel such as carbon and/or hydrocarbons may also be added to this carrier gas.

Looking to the accompanying drawing, there is shown a reactor 1 resembling a shaft furnace for carrying out the final reduction step. The reactor is supplied through the top at 2 with a solid reducing agent, in this case carbon, e.g. coke 3, through a gastight charging equipment 4. Oxidic material (e.g. iron ore) and the chromite material—contained in the vessel 20—is together with a slag former contained in the vessel 19 blown into the bottom of the reactor through tuyeres 5 through pipe 6. At the same time a fuel is blown through pipe 7, preferably through the tuyeres 5. The final reduction and the melting occur instantaneously and the molten metal 8 flows to the bottom during a simultaneous carburization. From here the hot metal produced and the slag can be tapped continuously or intermittently through tap hole 9, 10.

The temperature of the reactor is controlled, and heat for carrying out the reduction is supplied, by means of a plasma arc heater 11.

As is disclosed in U.S. Pat. No. 4,072,504, the oxidic material (e.g. the iron ore) may be pre-reduced by the hot reducing gas 12 from the reactor 1. This hot reducing gas, which contains a mixture of carbon monoxide and hydrogen in a relatively high concentration, is temperature controlled mainly by water injection in the upper part of the shaft. The pre-reduction can be done in one or more steps according to known methods, e.g. in a fluidized bed 14. In this regard, a suitable degree of pre-reduction for the oxidic material is 50–75%.

The outgoing gas in pipe 15 from the pre-reduction step still contains a relatively large amount of combustible gases and can therefore be used for a variety of purposes including pre-heating and drying of ingoing oxidic material.

The oxidic material from the pre-reduction step fed to the reactor, in this case iron ore, is preferably fine grained and can be in the form of ore concentrate or a mixture of concentrate. As a carrier gas for injecting the material one can use advantageously a small amount of the reduction gas from the reactor in pipe 16, which has been purified in an appropriate cleaner or filter 17 and transported by means of a compressor 18.

The reactor and the coke bed are dimensioned so that the injected mixture of pre-reduced material and chromite is caught up in the hot lower portion of the coke bed 3 and furthermore so that the outgoing reduction gas in pipe 12 consists of the above-mentioned mixture of carbon monoxide and hydrogen in high concentration. The ratio $CH/H_2$ is controlled by the fuel addition in the lower portion of the reactor.

The present invention is particularly adaptable for processing flue-gas dust, e.g. chromiferous dust, and the like. The chromium content in the crude iron from the first step of the process according to the invention can easily be adjusted to the desired chromium content in the AOD by mixing the types of dust used.

The desired chromium content is always lower than that obtained in ferro-chromium furnaces and this also enables the first step of the process according to the invention suitable to be performed at temperature levels of between about 1500° and 1650° C., preferably 1550°–1600° C., as against 1650° to 1700° C. for the ferro-chromium furnace, without any deterioration in the chromium yield. This is due to the lower chromium activity in the metal phase in the first step of the invention. These temperatures can be compared with those normal in the manufacture of crude iron, i.e. 1350° to 1450° C.

By controlling the temperature level the silicon content of the chromiferous crude iron can easily be controlled, and thus the scrap melting capacity of the AOD converter. An increase of 0.1% in the silicon content, for instance, represents an increased scrap melting capacity of about 75 kg per ton of chromiferous crude iron. Such control of the silicon content in the chromiferous crude iron enables the scrap melting capacity of the AOD equipment to be easily adjusted to suit the prevailing scrap balance.

Since the first step according to the invention is completely closed the energy-rich gas can be usefully employed (for instance as fuel in heating furnaces, for generating electricity, etc.) and, furthermore, in a considerably simpler and safer manner than in conventional ferro-chromium furnaces. This means that with no inconvenience it is possible to reduce larger quantities of iron per chromium equivalent so that the quantity of exhaust gas per chromium equivalent increases and a chromiferous crude iron adapted directly to the AOD equipment can be produced. This in turn means that equipment for performing the first step according to the invention, i.e. for processing chromiferous dust, will obviously be in conjunction with the AOD works.

The total energy consumption is thus reduced by approximately 600 kilowatt hours per ton due to the elimination of the arc furnace and an additional 150 kilowatt hours per ton because the first step according to the invention operates at a temperature level which is approximately 150° C. lower than conventional processes. Finally, the exhaust gas energy can be usefully employed according to the invention.

Furthermore, by means of the method according to the invention the production capacity in the AOD works can be considerably increased since the charge time in the AOD works and the tapping interval in the means used for performing the method according to the invention can easily be adjusted to one another.

The invention may be further explained with reference to the following example:

EXAMPLE I (using chromite)

A basic metal for the manufacture of stainless steel was produced in accordance with the plasma melting process, i.e. the first melt reduction step according to the invention, from a mixture of chromite having a low Cr/Fe ratio (1.8/1) and iron ore (65% Fe). The composition of the basic metal was as follows:
4.8% C
1.2% Si
0.3% Mn
19.6% Cr
the remainder primarily Fe The following data were applicable in the manufacture of 1 ton of basic metal:
A mixture of
530 kg low ratio chromite (38% Cr, 22% Fe)
970 kg Iron ore (65% Fe)
was reduced in two series-connected fluidized beds to a pre-reduction level of the ferric oxide part of about 70%.
The mixture was then injected, together with
185 kg coal dust
into the melt reduction shaft where it was melt-reduced to a basic metal having the above composition.

Besides the 185 kg coal dust, the energy consumption for the melt reduction was
60 kg coke
1750 kWh
slag quantity approximately 300 kg
tapping temperature 1640° C.

Immediately after tapping the basic metal was refined with 100 kg ferro-nickel and 180 kg stainless steel scrap to a stainless steel of 18/8 type having a carbon content of 0.04%. The yield of fluid steel was 1180 kg.

The following consumption was obtained per ton of stainless steel:

| 157 kg pit coal | 1.05 |
|---|---|
| 51 kg coke | 0.35 Gcal |
| 1455 kWh | 1.27 Gcal |
| Σ energy | 2.67 Gcal |
| 85 kg nickel | |
| 153 kg stainless steel scrap | |

By way of comparison it may be mentioned that the heretofore most commonly used process for the production of stainless steel entails the use of the following process steps:
1. ferro-chromium furnace
2. sponge iron furnace
3. electric arc furnace
4. AOD refining With the same scrap charge as in the example above, the energy consumption in this known process will be as follows:

| ferro-chromium (67%) | 236 kg | 1.3 Gcal |
|---|---|---|
| sponge iron | 580 kg | 1.8 Gcal |
| stainless steel scrap | 185 kg | — |
| nickel | 85 kg | — |
| melting in arc furnace | | 0.5 Gcal |
| Σ energy | | 3.6 Gcal |

From the above comparison it is clear that the two-step process according to the invention, besides being considerably simpler, also results in a 25% saving in energy.

We claim:
1. A two step method of manufacturing chromium steel comprising the first step of injecting a starting material in the form of fine grains and containing chromium oxide and iron oxide into the lower portion of a reactor having an upper and a lower portion; said reactor containing a solid reducing agent, passing said starting material into a reduction zone within said lower portion, said reduction zone being maintained by the use of a plasma generator adjacent thereto, simultaneously injecting carbon and/or hydrocarbon fuel into said reduction zone, substantially instantaneously reducing and melting said starting material in said reduction zone, and removing the melted and reduced chromiferous product from the bottom of the reactor, and a second step of further refining the chromiferous product to produce chromium steel.

2. A method according to claim 1 including the step of maintaining the temperature of the melted product in the reactor at a temperature of from about 1500° C. to about 1650° C.

3. A method according to claim 1 wherein the starting material also includes a slag former.

4. A method according to claims 1, 2, or 3 wherein the starting material is blown into the reactor together with a carrier gas.

5. A method according to claim 4 wherein a portion of the reaction gas generated in the reactor is used as a carrier gas.

6. A method according to claim 4 wherein a portion of the reaction gas generated in the reactor is used as a plasma gas.

7. A method according to claim 1 wherein a portion of the silicon content of the chromiferous crude iron product is regulated by controlling the temperature level in the reactor.

8. A method according to claim 1 wherein the chromiferous product is further refined after removal from the reactor.

9. A method according to claim 8 wherein the chromiferous product is further refined in an AOD convertor.

10. A method according to claim 1 including the step of prereducing the starting material.

11. A method according to claim 1 wherein the starting material is flue-gas dust containing chromiferous materials.

* * * * *